(12) United States Patent
Ok

(10) Patent No.: US 9,639,190 B2
(45) Date of Patent: May 2, 2017

(54) DISPLAY FOR REFRIGERATOR

(75) Inventor: Seung-Min Ok, Changwon (KR)

(73) Assignee: LG ELECTRONICS INC., Seoul (KR)

( * ) Notice: Subject to any disclaimer, the term of this patent is extended or adjusted under 35 U.S.C. 154(b) by 594 days.

(21) Appl. No.: 13/554,029

(22) Filed: Jul. 20, 2012

(65) Prior Publication Data

US 2013/0082948 A1 Apr. 4, 2013

(30) Foreign Application Priority Data

Oct. 25, 2006 (KR) .................. 10-2006-0104172
Nov. 18, 2006 (KR) .................. 10-2006-0114198

(51) Int. Cl.
| G06F 3/041 | (2006.01) |
| F25C 1/18 | (2006.01) |
| F25B 49/00 | (2006.01) |
| G08B 5/22 | (2006.01) |
| G02F 1/1335 | (2006.01) |
| F25D 29/00 | (2006.01) |

(52) U.S. Cl.
CPC .......... G06F 3/0412 (2013.01); F25D 29/00 (2013.01); F25D 2400/361 (2013.01)

(58) Field of Classification Search
CPC ... F25D 2400/361; F25D 29/00; G06F 3/0412
USPC .............. 62/125, 68; 345/173; 340/815.43; 349/112
See application file for complete search history.

(56) References Cited

U.S. PATENT DOCUMENTS

| 5,134,505 A | 7/1992 | Tanaka et al. |
| 5,903,089 A * | 5/1999 | Donofrio .............. H01J 29/894 313/112 |
| 6,637,214 B1 * | 10/2003 | Leitzke .................. A23G 9/163 62/342 |
| 6,664,489 B2 * | 12/2003 | Kleinhans ............ H03K 17/962 200/313 |
| 6,842,170 B1 * | 1/2005 | Akins et al. .................. 345/173 |
| 7,446,827 B2 | 11/2008 | Ko et al. |
| 7,531,238 B2 * | 5/2009 | Mizuno et al. ............ 428/423.5 |
| 2002/0003531 A1 * | 1/2002 | Kim et al. ..................... 345/173 |
| 2002/0005924 A1 * | 1/2002 | Kimura ........................ 349/112 |
| 2002/0190964 A1 * | 12/2002 | Van Berkel .................. 345/173 |
| 2003/0054878 A1 * | 3/2003 | Benoy et al. .................. 463/29 |
| 2004/0239519 A1 * | 12/2004 | Midlang ................. 340/815.45 |
| 2005/0017994 A1 * | 1/2005 | Oh ....................... G09G 3/3406 345/691 |

(Continued)

FOREIGN PATENT DOCUMENTS

| JP | 7-289426 A | 11/1995 |
| JP | 2001-324607 A | 11/2001 |

(Continued)

*Primary Examiner* — Henry Crenshaw
(74) *Attorney, Agent, or Firm* — Birch, Stewart, Kolasch & Birch, LLP

(57) ABSTRACT

A display for a refrigerator, which can uniformly form a diffusing area, is provided. The display includes a process unit receiving a variety of operation signals for operating the refrigerator, a front cover provided in front of the process unit and including a pushing portion displaying an input location of a user and a light transmission portion transmitting light, and a diffusion sheet provided in rear of the front cover and uniformly diffusing the light.

15 Claims, 4 Drawing Sheets

(56) References Cited

U.S. PATENT DOCUMENTS

2005/0174335 A1\* 8/2005 Kent et al. .................... 345/173
2006/0227532 A1\* 10/2006 Ko ........................ G06F 3/0202
                                                                            362/85

FOREIGN PATENT DOCUMENTS

| KR | 10-0578400 B1 | 5/2006 |
| KR | 1020060083552 A | 7/2006 |
| KR | 10-2006-0092637 A | 8/2006 |

\* cited by examiner

DISPLAY FOR REFRIGERATOR

CROSS REFERENCE TO RELATED APPLICATIONS

This application is a Continuation of co-pending application Ser. No. 12/442,677 filed on Mar. 24, 2009, which is the national phase of PCT International Application No. PCT/KR2007/005214 filed on Oct. 23, 2007, and which claims priority to Application No. 10-2006-0104172 filed in the Republic of Korea on Oct. 25, 2006, and 10-2006-0114198 filed in Republic of Korea on Nov. 18, 2006. The entire contents of all of the above applications are hereby incorporated by reference.

TECHNICAL FIELD

The present disclosure relates to a display for a refrigerator.

BACKGROUND ART

Generally, a refrigerator is a home appliance that stores food at a low temperature. The refrigerator has a main body defining a storage chamber in which the food is stored and a door that is coupled to the main body to selectively open and close the storage chamber.

A display is installed on the door to display an operational state of the refrigerator. The display has a display unit and an operational signal input unit for inputting a variety of operation signals for operating the refrigerator.

In more detail, the operational signal input unit includes a polycarbonate sheet and a printed layer for designing the polycarbonate sheet, and a diffusing area for diffusing light emitted toward a rear surface of the polycarbonate sheet.

A front surface of the polycarbonate sheet is exposed on a front surface of the refrigerator for the contact with a user. The printed layer is formed performing a silkscreen printing process on the rear surface of the polycarbonate sheet. The diffusion area is formed by spraying diffusion ink on a rear surface of the printed layer.

However, according to the display of the related art, since the diffusion ink is directly sprayed on the rear surface of the operational control signal input unit to form the diffusion area on the operational signal input unit, a boundary portion of the diffusion area is clearly defined and it is difficult to partly vary a color of the diffusion ink.

Further, since the diffusion ink for forming the diffusion area is not absorbed in glass or acryl board, the operation control signal input unit has be formed of the polycarbonate. Since the polycarbonate has less strength and durability as compared with the glass and acryl, the front surface of the operation control signal input unit formed of the polycarbonate might be easily scratched or torn when the refrigerator is used for a long time.

DISCLOSURE OF INVENTION

Technical Problem

Embodiments provide a display for a refrigerator, which is sleek and clean and easily variable in its illumination color.

Embodiments also provide a display for a refrigerator, which can provide a uniform diffusion area regardless of a material of a front cover.

Embodiments also provide a display for a refrigerator, which can enhance a sense of unit by displaying a display window and other portions with an identical color.

Technical Solution

In one embodiment, a display for a refrigerator includes a process unit receiving a variety of operation signals for operating the refrigerator; a front cover provided in front of the process unit and including a pushing portion displaying an input location of a user and a light transmission portion transmitting light; and a diffusion sheet provided in rear of the front cover and uniformly diffusing the light.

In another embodiment, a display for a refrigerator includes a front board having a display window and a margin portion; a printed layer formed on the front board; and a diffusion sheet that is attached in rear of the printed layer to diffuse the light.

In still another embodiment, a display for a refrigerator includes a control panel having a light emission component; a diffusion sheet located in front of the control panel and printed with a specific color-base; and a front cover disposed in front of the diffusion sheet, the front cover including a display window formed corresponding to the diffusion sheet and a margin portion defining an alter portion of the display window.

Advantageous Effects

According to the embodiments, since a diffusion sheet is attached on the front cover, the diffusion area can be formed to be clean and sleek and a distribution of light passing through a light transmission unit can be uniformly realized.

Further, a variety of light emission colors can be realized by varying a color of the diffusion sheet even when a monochrome light emission unit is used.

Furthermore, since the diffusion sheet is attached on a rear surface of the front cover, the diffusion area can be formed regardless less of a material of the front cover. In this case, the front cover may be formed of a glass board or an acryl board.

In addition, since the display window and other portions can be formed with an identical color, a sense of unity can be enhanced and an overall appearance can be improved.

It is to be understood that both the foregoing general description and the following detailed description of the present disclosure are exemplary and explanatory and are intended to provide further explanation of the disclosure as claimed.

BEST MODE FOR CARRYING OUT THE INVENTION

Reference will now be made in detail to the embodiments of the present disclosure, examples of which are illustrated in the accompanying drawings. Although embodiments have been described with reference to a number of illustrative embodiments thereof, it should be understood that numerous other modifications and embodiments can be devised by those skilled in the art that will fall within the spirit and scope of the principles of this disclosure.

Figure 1:
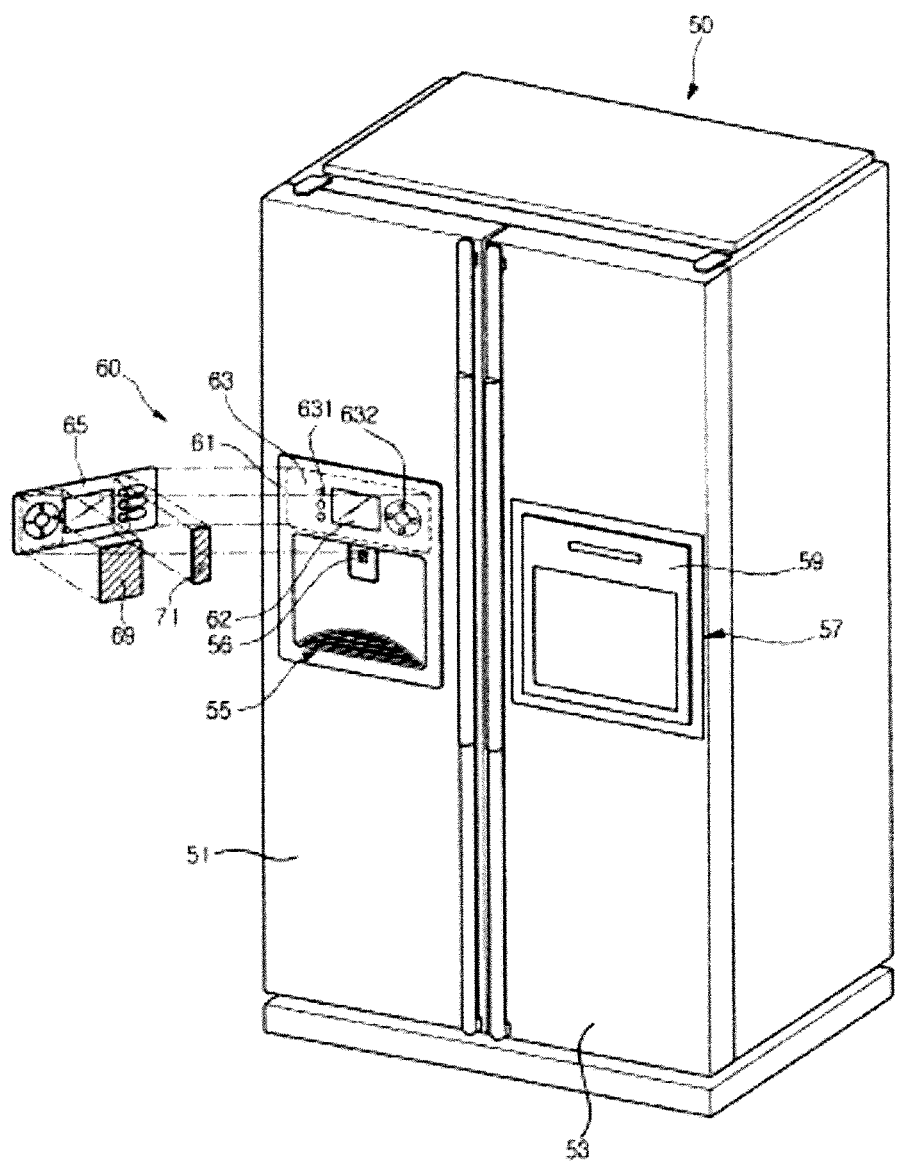
FIG. 1 is a perspective view of a refrigerator from which a display of a first embodiment is separated.
Figure 2:
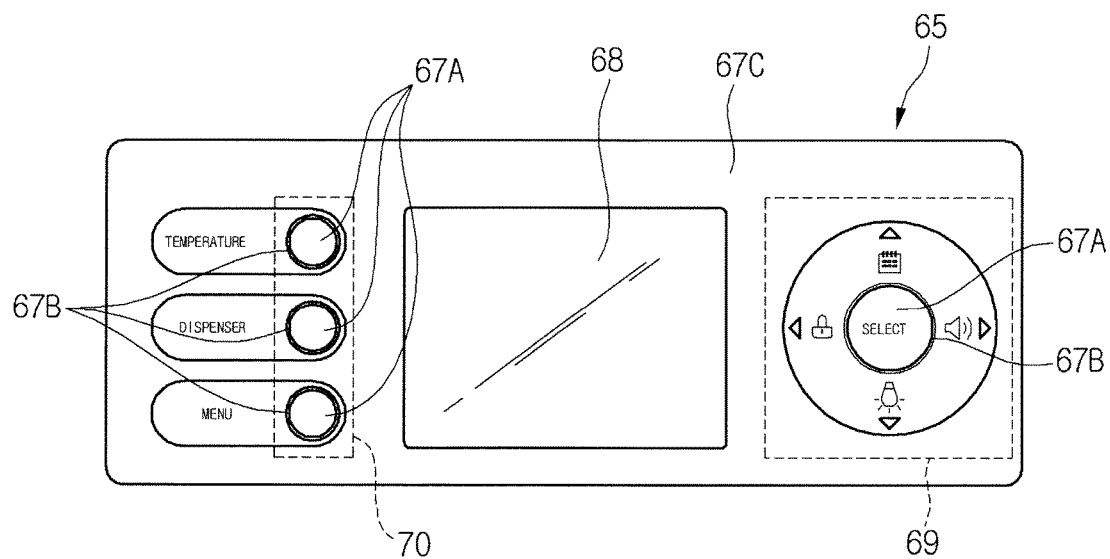
FIG. 2 is a front view of a front cover of the display of FIG. 1.
Figure 3:
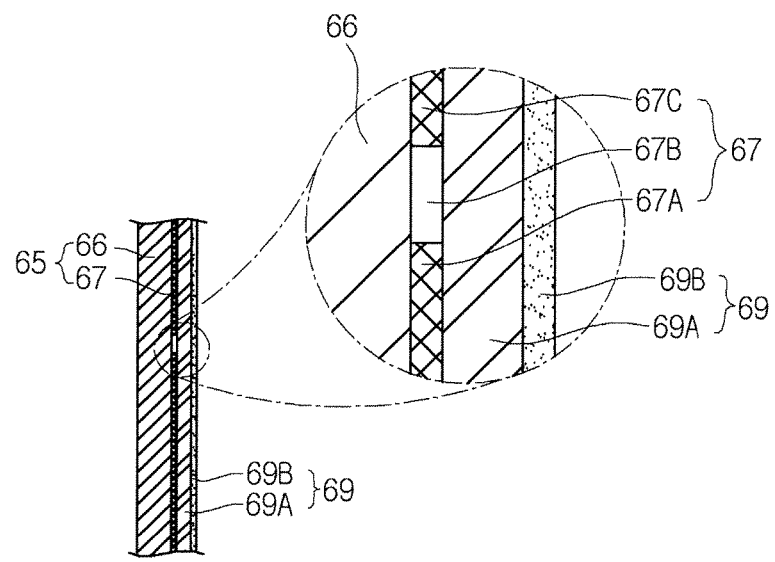
FIG. 3 is a sectional view of the front cover of FIG. 2.

FIG. 1 is a perspective view of a refrigerator from which a display of a first embodiment is separated, FIG. 2 is a front view of a front cover of the display of FIG. 1, and FIG. 3 is a sectional view of the front cover of FIG. 2.

Referring to FIGS. 1 through 3, a refrigerator includes a main body 50 defining freezing and refrigerating compartments, a freezing compartment door 51 for opening and closing the freezing compartment, and a refrigerating compartment door 53 for opening and closing the refrigerating compartment. The freezing and refrigerating compartment doors 51 and 53 are pivotally installed on the main body 50.

A dispenser 55 is provided on the freezing compartment door 51. The dispenser 55 allows a user to get water stored in a water tank provided in the main body 50 or ice cubes made in an ice making apparatus without opening the freezing compartment door 51. The dispenser includes a valve (not shown) for dispensing water and/or a lever 56 for driving an ice separating unit (not shown) dispensing the ice cubes.

A home bar 57 is provided on the refrigerating door 53. The home bar 57 allows the user to get or dispose beverages or the like without opening the refrigerating door 53. The home bar 57 is selectively opened by a home bar door 59 that is pivotally installed on a front portion of the refrigerating door 53.

Meanwhile, a display is provided above the dispenser 55. The display 60 receives a variety of manipulation signals for operating the refrigerator and displays information on the operation of the refrigerator to an external side.

In more detail, the display 60 includes a main body display unit 61 mounted on the main body 50 and a front cover 65 coupled to the main body display unit 61.

The main body display unit 61 is provided with a display area 62 for displaying information on the operation of the refrigerator. For example, information on an amount of ice dispensed through the dispenser 55, an amount of purified water dispensed through the dispenser 55, temperatures of the freezing and refrigerating compartments, a schedule, and the like is displayed. A process unit 63 is provided on either sides of the display area 62. The process unit 63 includes a system for processing information on the dispensing of ice and water, the control of the temperatures of the freezing and refrigerating compartments, the management of the schedule, and the like. A plurality of light emission units 631, 632 for emitting light to a rear surface of the front cover 65 is provided on the process unit 63. The plurality of light emission units may include a plurality of light emitting diodes (LEDs).

The front cover 65 covers the front surfaces of the process unit 63 and the display area 62. The front cover 65 defines an outer appearance of the front surface of the display unit 60. The front cover 65 is designed to receive the manipulation signals through a touch-screen manner. That is, the front cover 65 includes a front board 66 defining a front surface of the display unit 60 and a printed layer 67 for designing the front board 66.

The printed layer 67 is formed on the rear surface of the front board 66 through a silkscreen printing process. A plurality of pushing portions 67A for letting the user know the input locations are formed on the printed layer 67. Each of the pushing portions 67A is provided at an edge with a light transmission portion 67B that can transmit a relative large amount of light emitted from the light emission unit. The light transmission portion 67B is substantially formed by not being colored during the silkscreen printing process or by colored with the relatively low depth.

Further, a display window 68 corresponding to the display area 62 of the main body display unit 61 is formed on the front cover 65 so that the display area 62 can be viewed well from the external side.

Meanwhile, a margin portion that will be colored with a variety of colors to design the front plate board 66 is formed on the printed layer 67 except for the pushing portion 67A, the light transmission portion 67B, and the display window 68. Letters, numbers, symbols, and the like for describing the pushing portion 67A are displayed on the margin portion 67C.

Diffusion sheets 69 and 70 are attached on the rear surface of the front cover 65 to cover the pushing portion 67A and the light transmission portion 67B. The diffusion sheets 69 and 70 uniformly diffuse the light emitted from the light emission unit provided on the process unit 63 and thus the luminance of the light transmitted to the light transmission portion 67B becomes uniform. That is, the variation in luminance of the light transmission portion 67B in accordance with a distance to the light emission unit can be prevented by the diffusion sheets 69 and 70. Therefore, the edge of the pushing portion 67A can uniformly emit light with the relatively small number of light emission devices provided on the process unit 73.

In this embodiment, the diffusion sheets 69 and 70 are prepared separately and attached on the front board 66. That is, each of the diffusion sheets 69 and 70 includes a thin sheet 69A formed of polyethylene terephalate (PET) and a diffusion ink layer 69b formed by applying diffusion ink on the thin sheet 69A. The diffusion sheets 69 and 70 may be formed in a variety of sizes in accordance with areas where they will be attached. The diffusion ink applied to the thin sheet may be formed in a variety of colors in accordance with the location of the light transmission portion 67B to vary the color of the light transmitted frontward of the light transmission portion 67B.

The following will describe operation of the display 60 structured as described above.

First, a process for manufacturing the front cover 65 will be described. The front board 66 formed of a glass material is prepared. The printed layer 67 is formed on the rear surface of the front board 66 through a silkscreen printing process, thereby forming the margin portion 67C defining an overall color of the front board 66, the pushing portion 67A defining a user s touch area, and the light transmission portion 67B that transmits a relatively large amount of light.

At the same time, a variety of letters and symbols for describing the pushing portion 67A are printed on the margin portion 67C. In addition, the display window 68 for allowing the display area 62 to be viewed from the external side is formed on the front board 65.

Next, the diffusion sheets 69 and 70 are attached on the rear surface of the front cover 65 on which the printed layer 67 is formed. When the front cover 65 on which the diffusion sheets 69 and 70 are attached is fixed on the front surface of the main body display unit 61, the display 60 is completed.

The following will describe a process for illuminating the front surface of the display 60.

When electric power is applied to the display 60, the light emission unit provided on the process unit 63 emits the light. The light emitted from the light emission unit is uniformly diffused by the diffusion sheets 69 and 70 attached on the rear surface of the front cover 65 and transmitted to the light transmission portion 67B. Then, as the light transmission portion 67B transmits the light, the light emitted from the light emission unit is transmitted to the external side and thus the light transmission portion 67B under the front cover 65 is uniformly illuminated.

Figure 4:
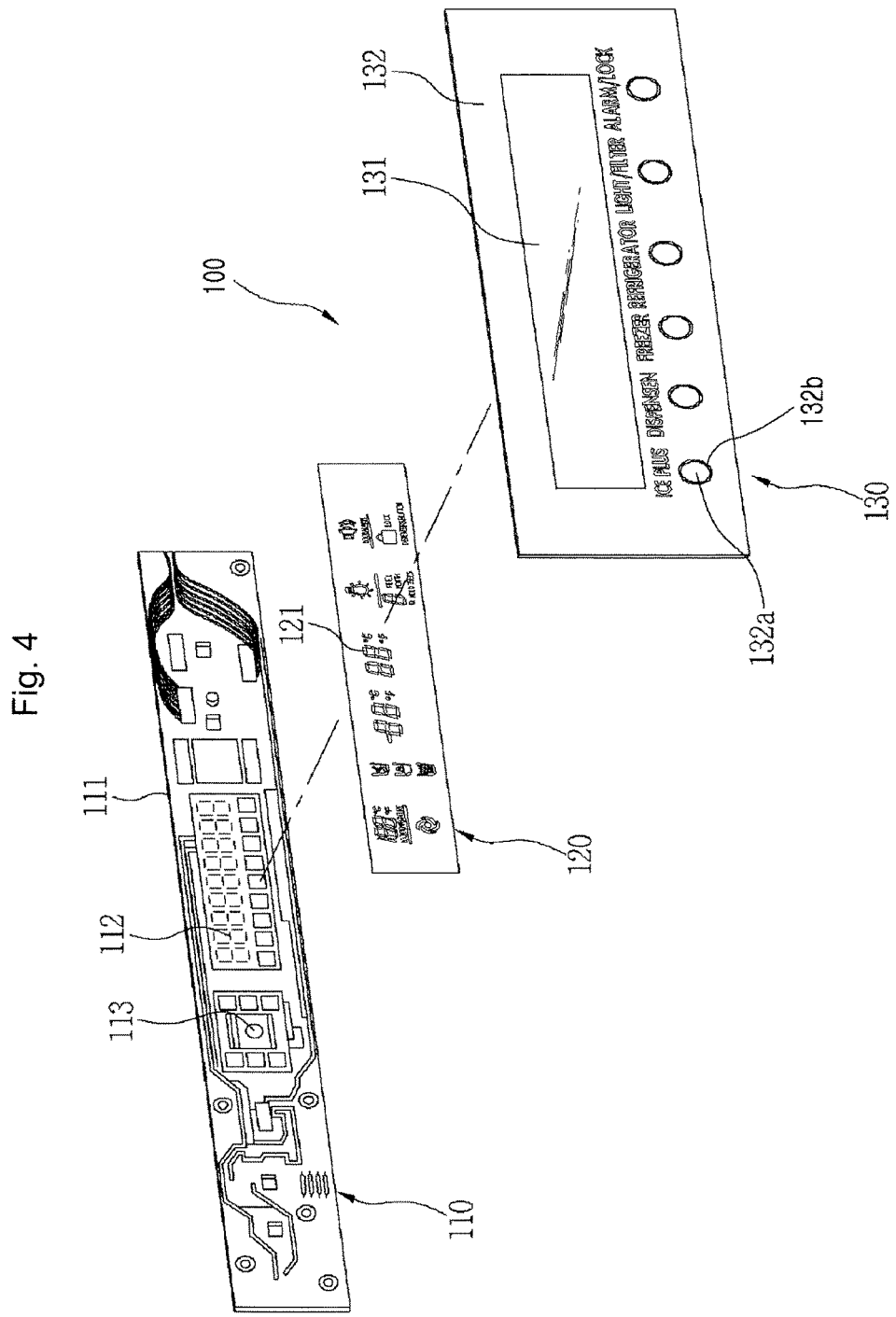
FIG. 4 is an exploded perspective view of a display according to a second embodiment.
Figure 5:
FIG. 5 is a rear view of a front cover of the display of FIG. 4.
Figure 6:
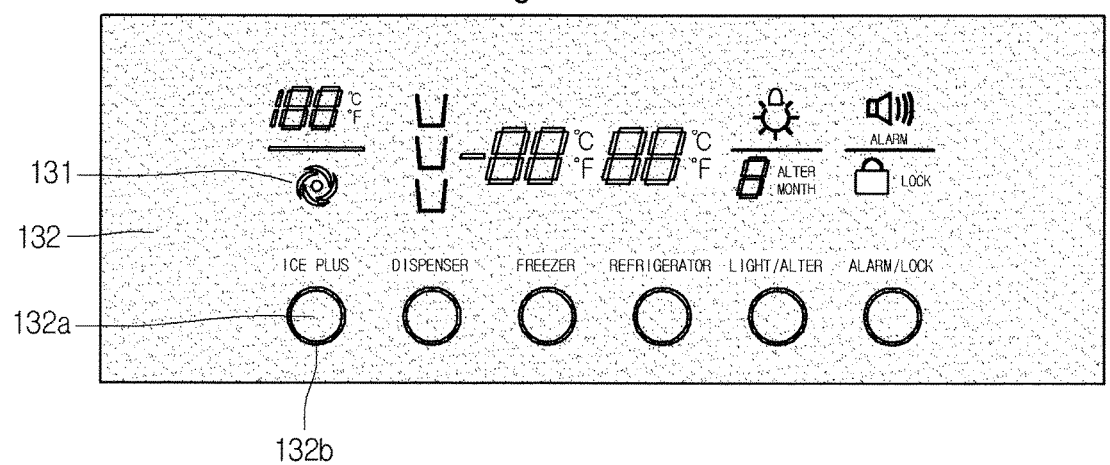
FIG. 6 is a front view illustrating operation of the display of FIG. 4.

FIG. 4 is an exploded perspective view of a display according to a second embodiment, FIG. 5 is a rear view of a front cover of the display of FIG. 4, and FIG. 6 is a front view illustrating operation of the display of FIG. 4.

Referring to FIGS. 4 through 6, a display 100 of this embodiment includes a control panel 110, a diffusion sheet 120, and a front cover 130.

The control panel 110 includes a printed circuit board 111. A seven-segment 112 for displaying an operation state of the refrigerator, light emitting diodes 113, and other electronic components are mounted on the printed circuit board. In addition, mechanical or electronic buttons (not shown) for adjusting the operation state of the refrigerator may be mounted on the printed circuit board 111. The control panel 110 may be fixed on, for example, a main body of the refrigerator.

The diffusion sheet 120 is printed with a specific color at a portion corresponding to the seven-segment 112 and the light emitting diodes 113 except for a portion corresponding to letters, numbers, and symbols. The diffusion sheet 120 is located corresponding to the display window of the front cover 130. The diffusion sheet 120 may be integrally formed with the printed circuit board 111 or attached on the display window by adhesive.

A portion of the rear surface of the front cover 130, which correspond to the display window 131, is smogged with a specific translucent color. The margin portion 132 is deeply colored with a specific color. A color identical to that of the margin portion may be printed on a front surface of the diffusion sheet 120. Here, the layer printed on the rear surface of the front cover 130 may be called a printed layer. The light transmission portion 1321) defining the pushing portion 132a for letting the user know the location of the input location is not printed on the margin portion 132.

For example, the front surface of the diffusion sheet 120 except for the portion 121 corresponding to the numbers, letters, and symbols is printed with a black color and the rear surface of the display window 131 is printed with a translucent gray color. In addition, the margin portion 132 may be printed with the black color.

That is, the rear surface of the front cover 130 is printed with an achromatic color and brightness of the display window 131 is greater than that of the margin portion 132.

Therefore, when the seven-segment 112 or light emitting diodes 113 of the control panel 110 emit light, as shown in FIG. 6, the diffusion sheet 120 and the display window 131 overlap with each other and thus the front surface of the front cover 130 is displayed with the black color. The margin portion 132 is also displayed with black. The operation state of the refrigerator is displayed with a specific color (e.g., a phosphor color) on the display window 131 and the buttons on the margin portion 132 is also displayed with the specific color (e.g., a phosphor color).

In this case, the display window 131 and the margin portion 132 are displayed with an identical color, a sense of unity can be enhanced and thus the outer appearance can be improved.

INDUSTRIAL APPLICABILITY

According to the embodiments, since the diffusion sheet is attached on the front cover, the display area can uniformly emit the light. In addition, the luminance color can be varied in accordance with the color of the diffusion sheet. Therefore, the industrial applicability of the present disclosure is very high.

What is claimed is:

1. A display for a refrigerator, comprising:
   a control panel including a light emitting diode and a printed circuit board;
   a front plate having a display window and a margin portion, the front plate covering the light emitting diode;
   a color printed layer formed on a rear surface of the front plate; and
   a diffusion sheet provided between the color printed layer and the control panel, the diffusion sheet configured to diffuse light from the light emitting diode;
   wherein the margin portion comprises:
      a pushing portion defining a user touch area; and
      a light transmission portion configured to transmit light from the light emitting diode, the light transmission portion being adjacent to the pushing portion,
   wherein the diffusion sheet faces the display window without facing the pushing portion and the light transmission portion,
   wherein the display window is smogged with a specific color,
   wherein a brightness of light of the display window is greater than a brightness of light of the margin portion, and
   wherein a color identical to a color of the margin portion is printed on a front surface of the diffusion sheet.

2. The display of claim 1, wherein the diffusion sheet is attached to a rear surface of the front plate.

3. The display of claim 1, wherein the diffusion sheet contacts the control panel.

4. The display of claim 1, wherein the pushing portion is formed as a shape of a letter or symbol.

5. The display of claim 4, wherein the light transmission portion surrounds the pushing portion.

6. The display of claim 1, wherein the diffusion sheet faces only the display window.

7. The display of claim 1, wherein a phosphor color is displayed on at least one of the display window and the light transmission portion.

8. A display for a refrigerator, comprising:
   a control panel including a light emitting diode and an electric button;
   a front cover that covers the control panel, the front cover comprising:
      a color printed layer;
      a display window covering the light emitting diode; and
      a margin portion covering the electric button and having a user touch area; and
   a diffusion sheet disposed between the front cover and the control panel, the diffusion sheet configured to diffuse light from the light emitting diode,
   wherein the diffusion sheet is printed with color except for a portion corresponding to a letter, number or symbol,
   wherein the diffusion sheet is arranged to face the display window without facing the user touch area,
   wherein the display window is smogged with a specific color,
   wherein a brightness of light of the display window is greater than a brightness of light of the margin portion, and
   wherein a color identical to a color of the margin portion is printed on a front surface of the diffusion sheet.

9. The display of claim 7, wherein the diffusion sheet is attached to a rear surface of the front plate.

10. The display of claim 7, wherein the diffusion sheet contacts the control panel.

11. The display of claim 7, wherein the diffusion sheet is arranged to face only the display window.

12. The display of claim 10, wherein a phosphor color is displayed on the display window.

13. The display of claim 10, wherein the margin portion includes a light transmission portion and a pushing portion adjacent to the light transmission portion.

14. The display of claim 12, wherein a phosphor color is displayed on the light transmission portion.

15. The display of claim 1, wherein a phosphor color is displayed on at least one of the display window and the light transmission portion.

* * * * *